United States Patent [19]

Robeson et al.

[11] Patent Number: 4,665,122

[45] Date of Patent: May 12, 1987

[54] POLYCARBONATE BLENDS

[75] Inventors: Lloyd M. Robeson, Whitehouse Station; James E. Harris, Piscataway; Louis M. Maresca, Belle Meade; James H. Kawakami, Piscataway, all of N.J.

[73] Assignee: Amoco Corporation, Chicago, Ill.

[21] Appl. No.: 757,780

[22] Filed: Jul. 24, 1985

Related U.S. Application Data

[63] Continuation of Ser. No. 527,985, Aug. 31, 1983, abandoned, which is a continuation-in-part of Ser. No. 486,018, Apr. 18, 1983, abandoned.

[51] Int. Cl.⁴ .................. C08L 51/04; C08L 69/00
[52] U.S. Cl. .................... 524/504; 524/508; 525/66; 525/67; 525/146; 525/147; 525/148
[58] Field of Search ............... 525/67, 146, 147, 148, 525/66, 468; 524/504, 508

[56] References Cited

U.S. PATENT DOCUMENTS

| | | | |
|---|---|---|---|
| Re. 31,165 | 3/1983 | Serini et al. | 525/67 |
| 3,737,409 | 6/1973 | Fox | 260/49 |
| 3,862,998 | 1/1975 | Koehler et al. | 260/873 |
| 4,324,869 | 4/1982 | Robeson | 525/68 |
| 4,369,136 | 1/1983 | Robeson et al. | 525/67 |

FOREIGN PATENT DOCUMENTS 0000547 7/1978 European Pat. Off.

OTHER PUBLICATIONS

Volker Serini et al., Die Angewandte Makromolekulare Chemie, 55 (1976), pp. 175–189 (Nr. 855).

Primary Examiner—Theodore E. Pertilla
Attorney, Agent, or Firm—Donald M. Papuga; William H. Magidson; Ralph C. Medhurst

[57] ABSTRACT

A moldable and compatible blend of 5 to 95 weight percent polycarbonate comprising from about 20 weight percent to 100 weight percent of repeating units (I) having the formula

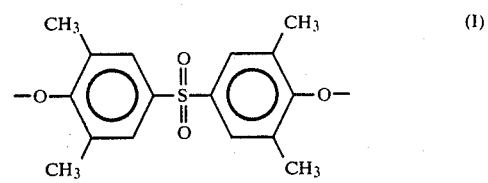

and from 0 weight percent to about 80 weight percent of repeating units (II) having the formula

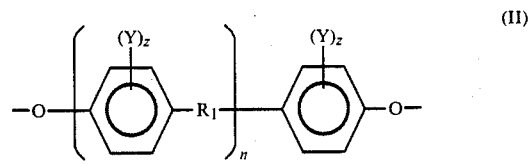

in which the repeating units (I) and the repeating units (II) are connected by interbonding units (III) having the formula

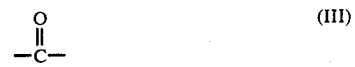

wherein Y is selected from alkyl groups of 1 to 4 carbon atoms, chlorine or bromine, each Z, independently, has a value of from 0 to 4 inclusive, n has a value of 0 or 1, and $R_1$ is a divalent saturated or unsaturated aliphatic hydrocarbon radical, O, CO, $SO_2$, S or a direct bond, with the proviso that when $R_1$ is $SO_2$ then repeating unit (II) is not the same as repeating unit (I), and 95 to 5 weight percent of a styrenic polymer.

22 Claims, No Drawings

POLYCARBONATE BLENDS

This application is a continuation of prior U.S. application Ser. No. 527,985, filed Aug. 31, 1983, now abandoned, which is a continuation-in-part application of Ser. No. 486,018 filed Apr. 18, 1983 now abandoned.

BRIEF SUMMARY OF THE INVENTION

Technical Field

This invention relates in general to compatible blends of polycarbonate and in particular to compatible blends of polycarbonate containing repeating units of the residues of bis-(3,5-dimethyl-4-hydroxyphenyl)sulfone, a dihydric phenol preferably, 2,2-bis-4(-hydroxyphenyl)-propane, and a carbonate precursor with styrenic polymers.

BACKGROUND OF THE INVENTION

Bis-(3,5-dimethyl-4-hydroxyphenyl)sulfone (hereinafter referred to as TMBS) and 2,2-bis-(4-hydroxyphenyl)propane (also known in the art as Bisphenol-A) have been described for use in making polycarbonate resins. U.S. Pat. No. 3,737,409, patented on June 5, 1973, describes a copolymer of the reaction product of TMBS, Bisphenol-A and a carbonate precursor wherein the bisphenol reaction mixtures of TMBS and Bisphenol-A are comprised of 40-99 weight percent of TMBS and a corresponding 60-1 weight percent of Bisphenol-A. The claims of the patent are directed to a copolymer as above described except that amount of TMBS used in the copolymer is 50-99 weight percent (and 50-1 weight percent of Bisphenol-A based on the total weight of TMBS and Bisphenol-A). Such proportions of these monomers in the manufacture of the polymer is urged by the patentee to enhance the hydrolytic stability of the resultant polycarbonate.

European Patent Publication No. 0,000,547 published July 2, 1979, discloses that copolycarbonates of an aromatic diphenol (e.g. Bisphenol-A) and an aromatic sulfonyl diphenol (e.g. bis-(alkylsubstituted-4-hydroxyphenyl)sulfone) exhibit improved heat deflection temperatures when the amount of sulfonyl diphenol is from 1% to 50% by weight of total diphenol and said sulfonyl diphenol is at least 99% pure 4-4' isomer by weight of total sulfonyl diphenol.

There is described by Serininl in *Angewandte Makrom. Chemie*, 55 (1976) pages 175-189 (Number 855) the manufacture of high molecular weight polycarbonates by interfacial polycondensatin of o,o,o', o'-tetramethyl-substituted bisphenols and phosgene. According to the reference, the synthesis of these polycarbonates requires the use of high concentrations of catalyst, high pH values, an excess amount of phosgene and a long condensation period. The polycarbonates are characterized by high second order transition temperatures, excellent hydrolytic stability, lower refractive indices and good thermoplastic processability. At page 182, the authors state that the polycarbonate based on bis-(3,5-dimethyl-4-hydroxyphenyl)sulfone is not melt stable.

Blends of the polycarbonate of Bisphenol A and acrylonitrile-butadiene-styrene,i.e., ABS, have been commercially employed for a long time. While the blends exhibit good mechanical compatibility, they have very poor weld-line strength and limited upper temperature stiffness. The poor weld-line strength is due to the immiscibility of Bisphenol A polycarbonate with the styrene/acrylonitrile matrix of ABS. If a modification of Bisphenol A polycarbonate could be made such that miscibility (single phase behavior) were achieved with styrene/acrylonitrile copolymer, the weld-line problem would be alleviated.

Because, the glass transition temperature of Bisphenol A polycarbonate is 150° C., the use temperature of a Bisphenol A polycarbonate/ABS blend is relatively low. Only by increasing the glass transition temperature of the polycarbonate could one achieve a blend having a desirably high use temperature.

If both of these deficiencies of Bisphenol A polycarbonates could be achieved by the same modification, interesting, useful blends of the modified Bisphenol A polycarbonate with ABS would be achieved.

DISCLOSURE OF THE INVENTION

The present invention involves moldable and compatible blends of polycarbonate and styrenic polymers which possess superior molding characteristics and physical properties.

The polycarbonate used in the practice of this invention comprises from about 20 weight percent to 100 weight percent of repeating units (I) having the formula

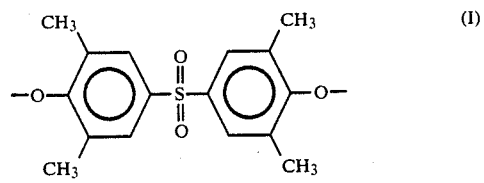

and from 0 weight percent to about 80 weight percent of repeating units (II) having the formula

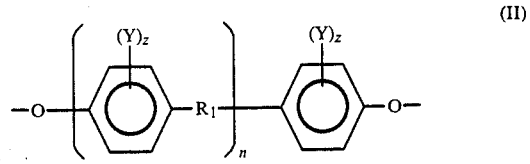

in which the repeating units (I) and the repeating units (II) are connected by interbonding units (III) having the formula

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, $SO_2$, S or a direct bond, with the proviso that when $R_1$ is $SO_2$ then repeating unit (II) is not the same as repeating unit (I). In a preferred embodiment, terminals units in the polycarbonate are bonded to repeating units (II). Such polycarbonates and the preparation thereof are described in copending U.S. patent application Ser. No. 486,018, filed on Apr. 18, 1983, now abandoned.

The process for making suitable polycarbonates for use in the blends of the present invention may be effected by the conventional solution or interfacial polymerization techniques for making polycarbonates, such as described in U.S. Pat. No. 3,737,409.

The polymer is, in a preferred embodiment, chain terminated, or capped, with the typical polycarbonate terminating agents such as monohydroxyphenolic compounds.

The styrenic polymers suitably employable in the practice of this invention are well known in this art. Included among the preferred copolymers and terpolymers are the styrene acrylonitrile copolymers (SAN), α-mthylstyrene-acrylonitrile copolymers, styrene-acrylonitrile-alkyl styrene copolymers, styrene-acrylonitrile-butadiene copolymers (ABS), and the like.

DETAILED DESCRIPTION

The polycarbonates employed in the blends of this invention can be produced by either the solution or interfacial processes known in the art for the manufacture of polycarbonates. The solution process involves reacting the carbonate precrsor, e.g., phosgene, with bisphenol compounds which give repeating units (I) and (II), for example, bis-(3,5-dimethyl-4-hydroxyphenyl)-sulfone and 2,2-bis-(4-hydroxyphenyl)propane. The reaction medium may be in a single organic phase employing a compatible solvent such as a halohydrocarbon and utilizing a base, such as pyridine, to accept by-product hydrogen chloride. Alternatively, interfacial polymerization techniques may be employed wherein the reaction media is composed of an organic phase and an alkaline aqueous phase. A phase transfer catalyst, that is, an acid exceptor, such as triethylamine may be used to accept the by-product hydrogen chloride from the condensation in the organic phase and to transfer the hydrogen chloride to the alkaline aqueous phase where it is neutralized and the catalyst is regenerated to its unprotonated form to accept additional hydrogen chloride. Additionally, chain length regulators such as para-tertiary-butyl phenol may be employed to limit the molecular weight and thus the viscosity of the polymer. Examples of the inerfacial polymerization process are described in U.S. Pat. No. 3,646,402, issued Feb. 29, 1972, and by P. W. Morgan, Condensation Polymers By Interfacial and Solution Methods (Interscience 1965).

The solution and interfacial polymerization techniques known in the art for the manufacture of polycarbonates can be applied equally in the practice of the instant invention, except as hereinafter modified.

The utilization of chain stoppers in the manufacture of polycarbonates is very well known in the art. Suitable chain stoppers include mono functional carboxylic acids or hydroxy compounds such as phenol, para-tertiary butylphenol, benzoic acid, para-tertiary butylbenzoic acid, and the like. The choice of a chain stopper is not critical to practice of the invention, any suitable mono-carboxylic acid or mono-hydroxy compound may be employed. The chain stopper unit, because it stops the growth of the polymer, becomes the terminal unit of the polycarbonate.

Any conventional organic solvent that will solvate the product polymer may be used, so long as the solvent is chemically unreactive in the polycarbonate polymerization. A preferred group of solvents is the chlorinated aliphtic hydrocarbons of 1-4 carbons such as dichloromethane, chloroform, carbon tetrachloride, dichloroethane, trichloroethane, trichloroethylene, tetrachloroethylene, and mixtures thereof. Another desirable class of solvents is the aromatic hydrocarbons and halogenated aromatic hydrocarbons such as toluene, monochlorobenzene, dichlorobenzene, and mixtures thereof. Preferred solvents are the chloromethanes and especially dichloromethane. The solvents used in a solution polymerization process are preferably water-free so as to avoid side reactions of the carbonate precursor.

The interfacial process involves the utilization of an organic phase and an aqueous phase. In carrying out the interfacial process, it is desirable that the organic solvent chosen be immiscible with water. The quantity of organic solvent and the concentration of the reactants in the solvent are not critical except that sufficient solvent should be present to dissolve the product polymer. An amount of dichloromethane sufficient to form a product polymer solution of about 30 weight percent polymer is generally the minimum amount of solvent for this particular system. Other materials such as chain length regulators, that is the chain stoppers, catalysts, foam depressants, and the like can also be present in the organic phase.

The aqueous phase is normally basic to the extent of a pH of at least about 8 and preferably at least about 9 prior to reaction. During reaction, the pH may vary within the range of about 7–12, but preferably is kept above 7 by the addition of base such as sodium hydroxide when needed.

The reactants, in an interfacial polymerization reaction, are provided in the aqueous phase and are referred to herein as bisphenolates. These reactants are normally formed by dissolving the bisphenols in water with an inorganic base, for example, an aqueous or alkaline earth metal hydroxide, preferably an alkali metal hydroxide, and most preferably, sodium hydroxide. In the preferred embodiment, the sodium bisphenolate of bis-(3,5-dimethyl-4-hydroxyphenyl)sulfone and the sodium bisphenolate of 2,2-bis-(4-hydroxyphenyl)-propane are utilized in the aqueous phase. The concentrations of the bisphenolates in the aqueous phase are not critical to the present invention. Concentrations up to the solubility limits of the bisphenol are preferred, such that excess amounts which will form a slurry are less desirable. A representative range for bisphenol-A is about 2 to 15 weight percent and preferable about 3 to 10 weight percent. Because the monomer/monomer ratio will affect the properties of the resulting polycarbonate, the concentration of bis-(3,5-dimethyl-4-hydroxyphenyl)-sulfone is adjusted with regard to the amount of bisphenol-A utilized, for the purpose of optimizing the properties of the resulting polymer. Other materials may be present in the aqueous phase in addition to the bisphenolates and excess base such as anti-oxidants, foam depressants, catalysts and chain stoppers.

The processes for making the polycarbonates, whether by solution polymerization or by interfacial polymerization, may be carried out at ambient temperature conditions, such as typical room temperature conditions, i.e. 23°–25° C. Higher and lower temperatures may be employed, taking into regard the problems of stabilizing an emulsion at temperatures above or below ambient temperatures. The solution process allows the use of a wide temperature range, no particular temperature being absolutely critical to the practice of the solution process.

The preferred feature in making the polycarbonate employed in the blends of this invention is that the requisite stoichiometric amount of the bisphenol compound which gives repeating units (II) described in the formula above, for example Bisphenol-A, is withheld from the initial polymerization reaction. That is, at least 15 weight percent of the total Bisphenol-A added is initially withheld from the reaction and added at the last stages of polymerization. This procedure yields a polymer wherein the terminal portions of the polymer contain a predominant amount of the Bisphenol-A monomer to the exclusion of the TMBS monomer. This is described more fully in copending U.S. patent application Ser. No. 486,018, filed on Apr. 18, 1983, and incorporated herein by reference.

This reserved amount is typically added to the polymerization reaction when the desired polymer growth has been attained and the chain regulator, or chain stopper, is to be added for polymer length regulation. Thus, the remaining Bisphenol-A is added concurrently with the chain regulator, e.g., p- t-butylphenol, and additional carbonate precursor, e.g., phosgene, to assure their reaction to lengthen and terminate the polymer. The amount of phosgene added is equivalent to that amount which is necessary to add the Bisphenol-A and the chain regulator to the polymer. If the chain regulator is added before the final addition of Bisphenol-A, the terminated polymer would be unable to react with the Bisphenol-A. Thus, it is important in the preferred embodiment not to chain stop the polymer before the last addition of Bisphenol-A used in the termination of the polymer.

Suitable bisphenol compounds which give repeating units (II) having the formula described above, in addition to 2,2-bis-(4-hydroxyphenyl)propane (Bisphenol A) and bis-(4-hydroxyphenyl)sulfone, include bis-(4-hydroxyphenyl)methane, 2,2-bis(4-hydroxy-3-methylphenyl)propane, 4,4-bis-(4-hydroxyphenyl)heptane, 2,2-bis-(3,5-dichloro-4-hydroxyphenyl)propane, 2,2-bis-(3,5-dibromo-4-hydroxyphenyl)propane and bis-(3-chloro-4-hydroxyphenyl)methane. Other bisphenol compounds are also available and are disclosed in U.S. Pat. Nos. 2,999,835, 3,028,365 and 3,334,154.

Conventional procedures may be used for addition of the additional amounts of Bisphenol-A, phosgene and the chain regulator. Preferably, the Bisphenol-A is added neat in the solution process or as the disodium salt dissolved in water in the interfacial process to the polymer system. In the solution process, the chain stopper can be added with or subsequently to the addition of the last amount of Bisphenol-A. Then phosgene can be bubbled through the solution and polymerization continued. In the interfacial process, the alkali salt of the chain stopper can be added with the Bisphenol-A, or the hydroxyl form can be added neat or in solution with the phosgene/dichloromethane solution added to the mixture. With additional stirring, the final polymerization phase is completed.

Polymer recovery can be achieved by processes well known in the art to recover a moldable polycarbonate that will exhibit excellent hydrolitic and thermal stability.

It is determined that the partial substitution of bis-(3,5-dimethyl-4-hydroxy phenyl)sulfone for Bisphenol A in polycarbonate formation yields a material with a significantly higher glass transition temperature and which is miscible with styrene copolymers especially styrene/acrylonitrile copolymers. For example, blends of this polycarbonate with ABS alleviate the shortcomings of the conventional Bisphenol A polycarbonate commercial systems, as aforedescribed.

The styrenic polymers, (i.e., copolymers, terpolymers, etc.) suitable for use herein include styrene/acrylonitrile copolymers, especially ABS type polymers, the molecules of which contain two or more polymeric parts of different compositions that are bonded chemically. The ABS type polymers are preferably prepared by polymerizing a conjugated diene, such as butadiene or a conjugated diene with a monomer copolymerizable therewith, such as styrene, to provide a polymeric backbone. After formation of the backbone, at least one grafting monomer, and preferbly two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

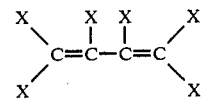

wherein X may be hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are the styrenes, such as: styrene, 3-methylstyrene; 3,5-diethylstyrene, 4-n-propylstyrene, α-bromostyrene, dichlorostyrene, dibromostyrene, tetrachlorostyrene, mixtures thereof, and the like. The preferred monovinylaromatic hydrocarbons used are styrene and/or α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 60% by weight or less of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The styrenes may comprise from about 30 to about 80% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene/acrylonitrile copolymer. Also, there are occasions where a copolymer, such as α-methylstyrene/acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

The amount of styrene copolymer to the polycarbonate may vary widely depending upon the properties sought from the molded products made from the blend. Though in the usual case there will be employed from about 25 to 75 weight percent of the polycarbonate to about 75 to 25 weight percent of the styrenic polymer. In the broadest sense, that range may be expanded to 95/5 of one polymer to the other.

Blending may be done in the usual fashion, such as by simple mixing of powders of the polymers, though usually in an extruder mixer. The extruded product will be a melt mixture of the polycarbonate and the styrenic polymer. Such can be pelleted and used as such in making molded articles of commerce.

The mixture of the two polymers is usually effected above the melting temperatures of the polymers. Usually mixing is effected at a temperature above 240° C. and typically not above 320° C.

The mixture of the polycarbonate and the styrenic polymer may include typical additives commonly added to polymeric materials such as UV stabilizers, thermal stabilizers, antioxidants, flame retardats, inorganic fillers, fiberglass, and carbon fibers. Of particular interest will be triaryl phosphate esters to be used as flame retardant additives. Additionally other polymers can be added to these blends including polyesters, such as poly(ethylene terephthalate) or poly(butylene terephthalate), polycarbonates including polyestercarbonates, such as Bisphenol A polycarbonate having the formula:

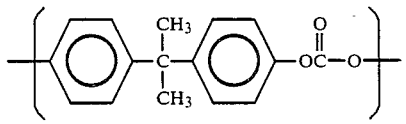

polyarylates, such as polyarylates based on Bispheol A and iso/terephthalates, poly(arylethers), such as Bisphenol A polysulfone having the formula:

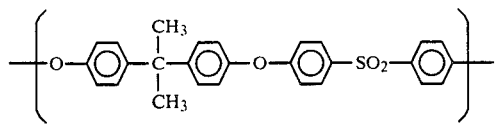

polyetherimides and the like in amounts up to 50 wt. %.

EXAMPLE 1

To a 4-necked one liter flask fitted with a nitrogen/phosgene sparger (coarse), thermometer, reflux condenser, and a 20% sodium hydroxide trap, and mechanical stirrer was added 38.25 grams (0.125 moles) of bis(3,5-dimethyl-4-hydroxyphenyl)sulfone(TMBS), 28.55 gms (0.125 moles) of 2,2-bis-(4-hydroxyphenyl)-propane (Bisphenol A), 500 ml of dichloromethane, and 125 ml of pyridine.

After initial sparging with nitrogen for 15 minutes, the phosgene was turned on and the nitrogen turned off. The phosgene was added at an approximate rate of 0.2 gms per minute at room temperature for 2½ hours. A total of about 34 gms of phosgene was added. The polymer was diluted with 200 ml dichloromethane and filtered to remove the pyridine hydrochloride. The solution was washed several times with 5% hydrochloric acid and 0.25% acetic acid solution and then several times with distilled water. The mixture was then coagulated in 50/50 acetone/methanol, filtered, and washed with methanol. The polymer was dried overnight under vacuum and 50° C. The reduced viscosity at 25° C. in 0.5% chloroform solution was 1.0.

EXAMPLE 2

To a reaction vessel equipped with a mechanical stirrer is charged 9.12 g (0.04 moles) of bisphenol A, 122.40 g (0.40 moles) of TMBS 200 ml of pyridine and 800 ml of methylene chloride. Phosgene is bubbled through the solution at about 0.5 gram per minute at room temperature and atmospheric pressure for a period of 100 minutes. A solution of 2.28 g (0.01 moles) of bisphenol A in 20 ml of pyridine is then added followed by 10 minutes of phosgene addition at a rate of 0.5 grams per minute. The reaction mixture is diluted with 500 ml of methylene chloride and washed sequentially with water, 5% hydrochloric acid solution and water. The polymer is isolated by coagalation in methanol and filtration. The product is dried in a vacuum oven at 60° C. overnight.

EXAMPLE 3

To a mixture of 250 ml of water, 300 ml of methylene chloride, 18.24 g (0.08 moles) of bisphenol A, 110.16 g (0.36 moles) of TMBS and 2 ml of triethylamine is added 50% sodium hydroxide solution until a pH of about 11 is obtained. While maintaining room temperature and a pH of about 11 (with a slow continuous addition of 50% NaOH) phosgene is added to the mixture at a rate of 0.5 grams per minute for 100 minutes. A solution of 4.56 g of bisphenol A, 3.2 g of 50% of NaOH in 25 ml of water is added to the mixture. Additional phosgene is then bubbled into the reaction at a rate of 0.5 gram per minute for 20 minutes. The organic layer is diluted with 500 ml of methylene chloride and then washed successively with 5% NaOH, water, 5% HCl and water. The polycarbonate is isolated by conventional methods and dried in a vacuum at 60° C. overnight.

EXAMPLE 4

A 4 gram sample of the polycarbonate of Example 1 was blended with 4 grams of a styrene/acrylonitrile copolymer (28% acrylonitrile)* in methylene chloride. The resultant solution was transparent and solution cast films were transparent. The sample was devolatilized in a vacuum oven and then compression molded in a 4"×4"×0.020" cavity mold at 240° C. The glass transition temperature of the resultant blend was 140° C. (intermediate between the constituent values of 100° C. for the styrene/acrylonitrile copolymer and 205° C. for the polycarbonate) thus showing miscibility of this particular blend. Bisphenol A polycarbonate was not miscible with the styrene/acrylonitrile copolymer and therefore transparency and excellent weld-line strength were not achievable.

measured as follows: A steel pendulum was used, cylindrical in shape with a diameter of 0.83 inch and weighing 1.562 pounds; the striking piece, mounted almost as the top of the pendulum was a cylinder 0.3 inch in diameter; film specimens, 4 inches long, 0.125 inch wide and about 1 to 30 mils thick were clamped between the jaws of the tester so that the jaws were spaced 1 inch apart; the 0.125 inch width of the film was mounted vertically; the pendulum was raised to a constant height to deliver 1.13 foot pounds at the specimen; when the pendulum was released the cylindrical striking piece hit the specimen with its flat end, break the film, and traveled to a measured height beyond; the difference in the recovery height (i.e., the difference in the potential energy of the pendulum at the maximum point of the upswing) represents the energy absorbed by the specimen during the rupture; the impact strength, expressed in foot-pounds per cubic inch, was obtained by dividing the pendulum energy loss by the volume of the specimen]; glass transition temperature (Tg) according to method of resilience, described in "Polymer-Polymer Miscibility",

*The copolymer has the following properties:

| Properties | Specimen | Test Methods | Typical Values (unless otherwise noted) |
|---|---|---|---|
| Values From Mechanical Tests | | | |
| Izod Impact Strength at 23° C., ft.-lb./inch notch | ⅛ × ½ × 2½ inch | D 256 | 0.55 |
| Izod Impact Strength at 23° C., ft.-lb./inch notch | ¼ × ½ × 2½ inch | D 256 | 0.45 |
| Tensile Strength, lb./inch$^2$ | ⅛-inch tensile bar | D 638 | 11,200 |
| Elongation in Tension, percent | ⅛-inch tensile bar | D 638 | 3.0 |
| Modulus of Elasticity in Tension, lb./inch$^2$ | ⅛-inch tensile bar | D 638 | $5.5 \times 10^5$ |
| Flexural Strength, lb./inch$^2$ | ¼ × ½ × 5 inch | D 790 | 17,500 |
| Modulus of Elasticity in Flexure, lb./inch$^2$ | ¼ × ½ × 5 | D 790 | $5.7 \times 10^5$ |
| Values From Miscellaneous Tests | | | |
| Rockwell Hardness, R Scale | ⅛ × 4 × 9 inch | D 785 | 125 |
| Water Absorption, gain in weight, percent | ⅛ × 4 × 9 inch | D 570 | 0.23 |
| Refractive Index, 23° C. | ⅛ × 4 × 9 inch | D 542 | 1.565 |
| Deflection Temperature at 264 psi., °F. (unannealed specimen) | ¼ × ½ × 5 inch | D 648 | 202 |
| Vicat Softening Point, °F. | ¼ × ½ × 5 inch | D 1525 | 220 |
| Values From Electrical Tests | | | |
| Dielectric Strength, Short Time, volts/mil | ⅛ × 4 × 9 inch | D 149 | 400, minimum |
| Volume Resistivity, ohm-cm. | ⅛ × 4 × 9 inch | D 256 | $10^{15}$, minimum |
| Dielectric Constant, 0, 10$^3$, 10$^6$ cycles | ⅛ × 4 × 9 inch | D 150 | 3.4 maximum |
| Dissipation Factor, 60, 10$^3$, 10$^6$ cycles | ⅛ × 4 × 9 inch | D 150 | 0.10 maximum |

EXAMPLE 5

A blend of 5 grams of the polycarbonate of Example 1 and 5 grams of an α-methyl styrene/acrylonitrile copolymer (69/31% by wt.) prepared in a two stage continuous production mode (bulk polymerization) and having a Rossi-Peakes flow of 0.61", was prepared in methylene chloride. The resultant solution was clear and films cast from the solution are transparent. Cast films were thoroughly devolatilized, and compression molded in a 4"×4"×0.020" cavity mold at 250° C. The resultant product was measured for the following properties: tensile strength and modulus according to a procedure similar to ASTM D-638; elongation at break according to a procedure similar to ASTM D-638; pendulum impact strength [(pendulum impact strength was Olabisi, et al. p. 126, Academic Press, New York, 1979; The properties are listed below:
1% Secant Modulus: 311,000 psi.
Tensile Strength: 10,900 psi.
% Elongation: 8%
Pendulum Impact Strength: 9 ft. lbs/in$^3$
Tg: 150° C.

The single glass transition temperature for this sample illustrates the miscibility of the constituents of the blend.

Description of Rossi-Peakes Flow

The Rossi-Peakes flow was determined on an apparatus described in U.S. Pat. No. 2,066,016. The test specimens consist of 3 die cut tablets, ⅜" diameter, cut from a 0.125" molded plaque. The temperature setting of 185°

CONTROL EXPERIMENT

A blend of 6 grams of Bisphenol A polycarbonate (Lexan 101, sold by the General Electric Co., Pittsfield, MA) having a reduced viscosity of 0.64 as measured in chloroform at 25° C. and 6 grams of the styrene/acrylonitrile copolymer described in Example 4 above, were dissolved in methylene chloride. After devolatilization in a vacumn oven, a sample was molded in a 4"×4"×0.020" cavity mold at 230° C. The resultant product exhibits obvious phase separation as the molded sample was opaque. The resilience temperature data for the sample (described in "Polymer-Polymer Miscibility", Olabisi, et al., p. 126, Academic Press, New York, 1979) revealed two distinct glass transition temperatures, thus showing experimental evidence of phase separation.

EXAMPLE 6

A blend of 6 grams of the polycarbonate described in Example 1 with 6 grams of a styrene-acrylonitrile copolymer (24% acrylonitrile) with a Vicat Softening Point of >217° F. was prepared in a methylene chloride solution. The solution was clear and a thin film cast from the solution was transparent. The solution was devolatilized in a vacuum oven, and the resultant solid was compression molded at 230° C. in a 4"×4"×0.020" cavity mold. The molded product exhibited a single Tg at 135° C. thus indicating miscibility.

EXAMPLE 7

A blend of 6 grams of the polycarbonate of Example 1 with 6 grams of a styrene-acrylonitrile copolymer (42% acrylonitrile) with a reduced viscosity of 0.50 in methyl ethyl ketone was prepared in a methylene chloride solution. The solution was clear and a thin film cast from the product was translucent and the resilience-temperature data indicated phase separation. This indicates that 42% acrylonitrile represents an upper limit on acrylonitrile content for the particular polycarbonate used in this example.

EXAMPLE 8

A blend of 6 grams of the polycarbonate of Example 1 and 6 grams of a filtered sample of Dow 213 ABS (matrix styrene-acryonitrile having an acrylonitrile content of 14 wt %) was prepared in a solution of methylene chloride. The filtration of the ABS was conducted to remove the rubber gel portion of ABS. The resultant solution was devolatilized and compression molded at 230° C. The resilience-temperature and modulus-temperature data exibit a very broad glass transition temperature of a peak resilience minimum at 165° C. This behavior indicates a certain degree of miscibility but close to a situation of phase separation. ABS based on a matrix SAN copolymer of 14% acrylonitrile would be near the lower limit of acrylonitrile content to allow for miscibility with the polycarbonate copolymer used in this example.

EXAMPLE 9

A blend of 6 grams of tetramethyl Bisphenol S/Bisphenol A (70/30 weight ratio)polycarbonate, prepared using a procedure similar to Example 2, with a reduced viscosity of 1.35 (0.5 grams/100 ml of chloroform at 25° C.) and 6 grams of the styrene-acrylonitrile copolymer of Example 4 was prepared in methylene chloride. The solution was clear and a thin film cast from the solution was transparent. The resultant product was thoroughly devolatilized and compression molded at 240° C. in a 4"×4"×0.020" mold. The transparent molded product exhibited a single Tg at 150° C. thus indicating miscibility.

EXAMPLE 10

A blend of 6 grams of the polycarbonate described in Example 9 and 6 grams of the styrene-acrylonitrile copolymer described in Example 6 was prepared in a methylene chloride solution. The solution was clear. The cast film was transparent, and the compression molded sample was transparent. The glass transition temperature was 142° C., and thus indicates miscibility of the constituents of this blend.

EXAMPLE 11

A blend of 27.0 grams of the polycarbonate described in example 9 and 9.0 grams of an ABS (Lustran 752; Monsanto Co.) was prepared in methylene chloride. The solution was devolatilized and compression molded at 265° C. in a 4"×4"×0.020" cavity mold. The mechanical properties using a procedure as described in Example 5 are listed in Table 1 along with the properties of the polycarbonate of this example. The mixture exhibited a single glass transition temperature of 180° C. as measured using the procedure described in Example 5. The pendulum impact strength was measured using the procedure descibed in Example 5.

EXAMPLE 12

A blend of 30 grams of the ABS employed in Example 11 with 30 grams of a Tetramethyl Bisphenol S/Bisphenol A (50/50 molar ratio) polycarbonate, with a reduced viscosity of 0.69 (as measured per the procedure noted in Example 1) was prepared in methylene chloride. The solution was devolatilized and compression molded at 260° C. in a 4"×4"×0.020" cavity mold. The mechanical properties were measured by the same procedure described in Example 11, and are listed in Table I. The mixture exhibited a glass transition temperature of 145° C. on a sample which was further mixed in a Brabender mixer at 270° C. The glass transition temperature was determined using the procedure described in Example 5.

EXAMPLE 13

The copolycarbonate was prepared via the interfacial polymerization process using equal molar amounts of tetramethylbisphenol S (30.63 grams) and the dichloroformate of bisphenol-A (35.32 grams), 20.0 grams (0.25 mole) of 50% sodium hydroxide, 750 ml distilled water, and 500 ml of dichloromethane. After 5 minutes of stirring, 2 ml of triethylamine was added. An ice/water bath was used to keep the temperature at 23°–25° C. and the reaction mixture was stirred for 2½ hours. The polymer solution was washed with water, dilute acid, and water and coagulated in methanol. The RV=1.12 (0.05 g/100 in chloroform at 25° C.).

EXAMPLE 14

A blend of seven grams of the tetramethyl Bisphenol S/Bisphenol A alternating polycarbonate described in example 13 and seven grams of the ABS described in example 11 was prepared in methylene chloride. The solution was devolatilized and then compression molded at 260° C. in a 4"×4"×0.20" cavity mold. The mechanical properties of the blend were measured by the same procedure described in Example 11 and are listed in Table 1. The mixture exhibited a glass transition temperature of 145° C. as determined using the procedure described in Example 5.

TABLE I

| Example | | 1% Secant Modulus (psi) | Tensile Strength (psi) | Elongation % | Pendulum Impact Strength (ft-lbs/in³) |
|---|---|---|---|---|---|
| 11 | Polycarbonate (TMBis S/ Bis A) 70/30 (wt ratio) | 223,000 | 9,720 | 8 | 14 |
| 11 | 75% Polycarbonate 25% Lustran 752 | 171,000 | 6,000 | 8 | 46 |
| 12 | Polycarbonate (TMBis S/ Bis A) (50/50 molar ratio) | 188,000 | 9,010 | 14 | 39 |
| 12 | 50% Polycarbonate 50% Lustran 752 | 237,000 | 6,310 | 11.0 | 54 |
| 14 | 50% Polycarbonate 50% Lustran 752 | 246,500 | 6,960 | 12.5 | 65 |

We claim:

1. A moldable and compatable blend of 5 to 95 weight percent polycarbonate comprising from about 20 weight percent to 100 weight percent of repeating units (I) having the formula (I)

and from 0 weight percent to about 80 weight percent of repeating units (II) having the formula (II)

in which the repeating units (I) and the repeating units (II) are connected by interbonding units (III) having the formula (III)

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, O, CO, $SO_2$, S or a direct bond, with the proviso that when $R_1$ is $SO_2$ then repeating unit (II) is not the same as repeating unit (I), and 95 to 5 weight percent of a styreneic-acrylonitrile polymer.

2. The blend of claim 1 wherein the styrenic polymer is an ABS polymer.

3. The blend of claim 2 wherein the ratio of the polymers is 25 to 75 to 75 to 25 weight ratio.

4. The blend of claim 1 wherein the styrenic polymer is styrene-acrylonitrile.

5. The blend of claim 1 wherein the styrenic polymer is α-methylstyrene-acrylonitrile.

6. The blend of claim 1 wherein the styrenic polymer comprises an α-methylstyrene-acrylonitrile copolymer blended with an ABS terpolymer.

7. The blend of claim 1 wherein the styrenic polymer is styrene-acrylonitrile-acrylate.

8. The blend of claim 7 wherein the acrylate is methylmethacrylate.

9. The blend of claim 1 wherein the styrenic polymer is a stryrene-acrylonitrile copolymer grafted onto an acrylate elastomeric backbone.

10. The blend of claim 1 wherein the styrenic polymer is a styrene-acrylonitrile copolymer grafted onto an ethylene-propylene-diene monomer (EPDM) elastomer.

11. The blend of claim 1 which also contains 0.5 to 12 wt go of a triaryl phosphate ester.

12. The blend of claim 1 which also contains a polyester.

13. The blend of claim 12 wherein the polyester is poly(ethylene terephthalate).

14. The blend of claim 12 wherein the polyester is poly(butylene terephthalate).

15. The blend of claim 1 which contains Bisphenol A polycarbonate of repeating units having the formula 16. The blend of claim 1 which also contains a polyarylate.

17. The blend of claim 16 wherein the polyarylate is based on Bisphenol A and iso/terephthalates.

18. The blend of claim 1 which also contains a poly(arylether).

19. The blend of claim 18 wherein the poly(arylether) is Bisphenol A polysulfone of repeating units having the formula 20. The blend of claim 1 wherein the blend also contains an aromatic poly(ester-carbonate).

21. The blend of claim 1 wherein the blend also contains a poly(ether imide).

22. A molded article made by the molding of the blend of claim 1.

* * * * *